(12) United States Patent
Sarkhel et al.

(10) Patent No.: US 11,430,219 B2
(45) Date of Patent: Aug. 30, 2022

(54) EXPLAINABLE VIDEO PERFORMANCE PREDICTION

(71) Applicant: Adobe Inc., San Jose, CA (US)

(72) Inventors: Somdeb Sarkhel, San Jose, CA (US); Viswanathan Swaminathan, Saratoga, CA (US); Stefano Petrangeli, Mountain View, CA (US); Md Maminur Islam, Memphis, TN (US)

(73) Assignee: Adobe Inc., San Jose, CA (US)

( * ) Notice: Subject to any disclaimer, the term of this patent is extended or adjusted under 35 U.S.C. 154(b) by 28 days.

(21) Appl. No.: 16/952,675

(22) Filed: Nov. 19, 2020

(65) Prior Publication Data
US 2022/0156499 A1    May 19, 2022

(51) Int. Cl.
*G06V 20/40* (2022.01)
*G06N 3/08* (2006.01)
*G06K 9/62* (2022.01)

(52) U.S. Cl.
CPC ........... *G06V 20/41* (2022.01); *G06K 9/6256* (2013.01); *G06K 9/6293* (2013.01); *G06N 3/08* (2013.01); *G06V 20/46* (2022.01)

(58) Field of Classification Search
None
See application file for complete search history.

(56) References Cited

U.S. PATENT DOCUMENTS

2019/0384981 A1    12/2019  Swaminathan et al.
2020/0021873 A1*   1/2020   Swaminathan .......... G06N 3/08

OTHER PUBLICATIONS

Ciaparrone et al., "Deep Learning in Video Multi-Object Tracking: A Survey", arXiv:1907.12740, Nov. 20, 2019, 42 pages.
Hussain et al., "Automatic Understanding of Image and Video Advertisements," 2017 IEEE Conference on Computer Vision and Pattern Recognition (CVPR), 2017, 11 pages.
Lou et al., "Content-based Effectiveness Prediction of Video Advertisements", ISM, 2018, 4 pages.
Ribeiro et al , ""Why Should I Trust You?", Explaining the Predictions of Any Classifier", Aug. 2016, 10 pages.
Sokeh et. al. "Superframes, A Temporal Video Segmentation", 10.1109/ICPR.2018.8545723, 2018, pp. 566-571.

(Continued)

*Primary Examiner* — Leon Flores
(74) *Attorney, Agent, or Firm* — Kilpatrick Townsend & Stockton LLP

(57) ABSTRACT

Systems and methods predict a performance metric for a video and identify key portions of the video that contribute to the performance metric, which can be used to edit the video to improve the ultimate viewer response to the video. An initial performance metric is computed for an initial video (e.g., using a neural network). A perturbed video is generated by perturbing a video portion of the initial video. A modified performance metric is computed for the perturbed video. Based on a difference between the initial and modified performance metrics, the system determines that the video portion contributed to a predicted user viewer response to the initial video. An indication of the video portion that contributed to the predicted user viewer response is provided as output, which can be used to edit the video to improve the predicted viewer response.

20 Claims, 8 Drawing Sheets

(56) References Cited

OTHER PUBLICATIONS

Wu et. al., "Compositional boosting for computing hierarchical image structures", In CVPR, 2007, 8 pages.
Ye et al., "Evaluating Two-Stream CNN for Video Classification", Proceedings of the 5th ACM on International Conference on Multimedia Retrieval, 2015, 8 pages.
Zauner, Christoph, "Implementation and Benchmarking of Perceptual Image Hash Functions," available at https://www.phash.org/docs/pubs/thesis_zauner.pdf (2010)), 107 pages.

* cited by examiner

EXPLAINABLE VIDEO PERFORMANCE PREDICTION

TECHNICAL FIELD

This disclosure generally relates to using artificial intelligence to facilitate editing or otherwise utilizing video content. More specifically, but not by way of limitation, this disclosure relates to techniques for using machine learning models to predict a performance metric for a video and identify key portions of the video that contribute to the performance metric, which can be used to edit the video to improve the ultimate viewer response to the video.

BACKGROUND

Digital content such as videos are increasingly popular. Generally, when providing digital content online, the aim is to reach the largest amount of viewers possible by creating content that attracts viewers. To that end, conventional systems commonly perform testing of videos after the fact. For example, the videos are provided to a set of viewers and the viewers provide feedback.

However, existing techniques for determining or predicting video effectiveness are often inaccurate. Video testing groups may not accurately represent the population or conditions for which the video will actually be viewed. Further, testing the video after it has been created is inefficient. If issues are identified, the content creator will have to go back and edit the video after it has been deployed. Further inefficiencies exist due to the need to disseminate and view the video across multiple client devices, which requires a great deal of computing resources.

SUMMARY

Certain embodiments involve techniques for using machine learning models to identify portions of a video that contribute to the watchability or performance of the video.

In some embodiments, a computer-implemented method comprises computing, with a neural network, an initial performance metric for an initial video; generating a perturbed video by perturbing a video portion of the initial video; computing, with the neural network, a modified performance metric for the perturbed video; determining, based on a difference between the initial and modified performance metrics, that the video portion contributed to a predicted viewer response to the initial video; and providing an interface for modifying the initial video to affect the initial performance metric, the interface including an indication of the video portion that contributed to the predicted viewer response.

In some aspects, the video portion includes a set of frames that are temporally contiguous. In some aspects, the method further comprises identifying the video portion by applying temporal segmentation or temporal clustering to the set of frames that are temporally contiguous.

In some aspects, the method further comprises identifying the video portion based on determining that a common object is depicted in multiple frames of the video portion. In some aspects, perturbing the video portion in the initial video comprises replacing frames in the video portion with different frames of the initial video.

In some aspects, the method further comprises perturbing a second video portion to generate a second perturbed video; and computing a second modified performance metric based on the second perturbed video. In some aspects, perturbing the video portion in the initial video comprises masking out one or more objects in multiple frames of the video portion. In some aspects, computing the modified performance metric comprises generating a vector representation of the perturbed video using a convolutional neural network; and computing the modified performance metric by, at least, analyzing applying a long short term memory (LSTM) network to the vector representation.

In some aspects, a computing system comprises a processor and a non-transitory computer-readable medium coupled to the processor, the non-transitory computer-readable medium including instructions which, when executed by the processor, cause performance of a method comprising: a step for computing different performance metrics for an initial video and a perturbed version of the initial video; determining, based on a difference between the different performance metrics, that a video portion contributed to a predicted viewer response for the initial video; and providing an indication of the video portion as an output.

In some aspects, a non-transitory computer-readable medium has instructions stored thereon, the instructions executable by a processing device to perform operations comprising: computing, with a neural network, an initial performance metric for an initial video; generating a perturbed video by perturbing a video portion of the initial video; computing, with the neural network, a modified performance metric for the perturbed video; determining, based on a difference between the initial and modified performance metrics, that the video portion contributed to a predicted viewer response to the initial video; and providing an indication of the video portion as output, wherein the indication of the video portion is usable for modifying the initial video to affect the initial performance metric. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
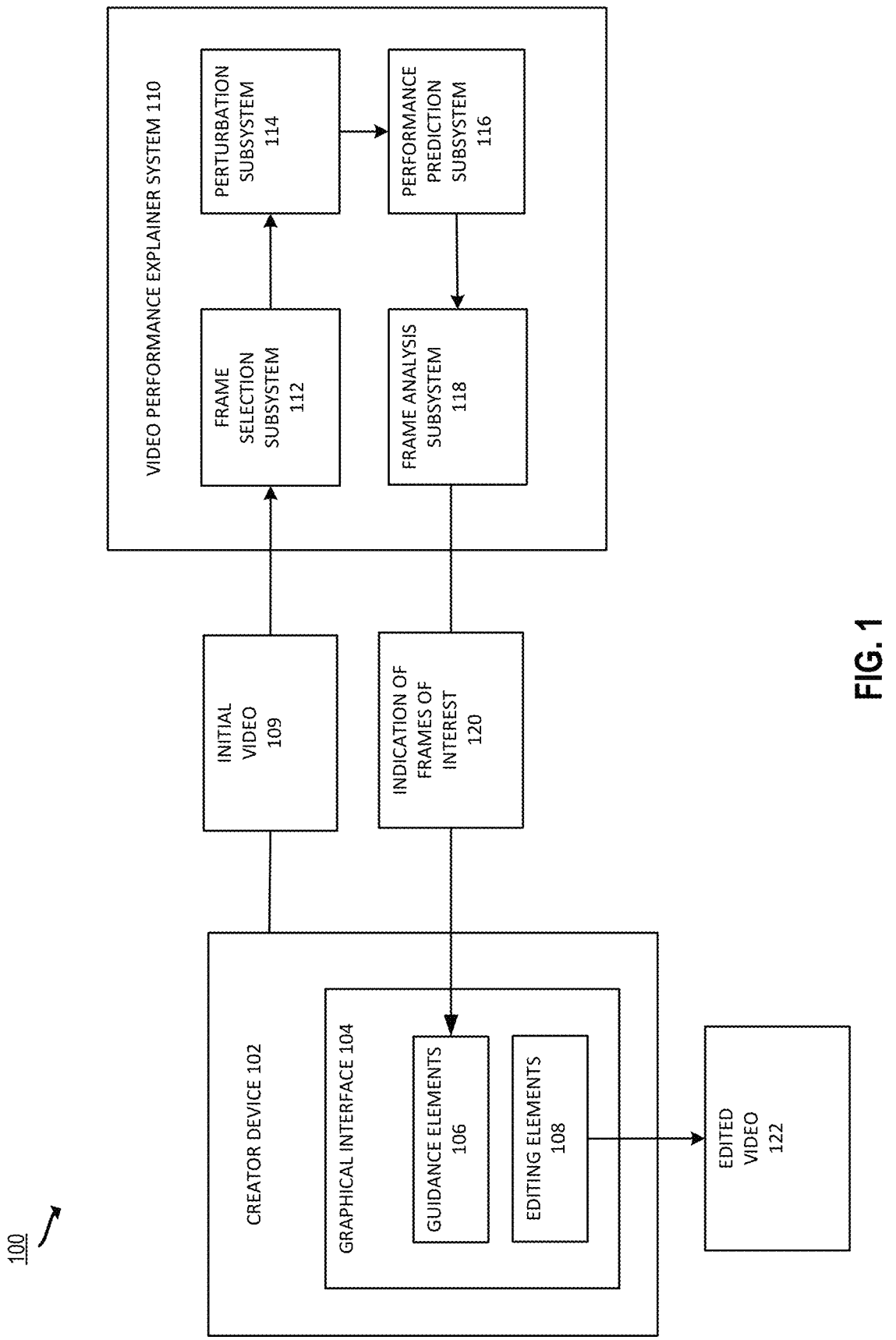
FIG. 1 depicts an example of a computing environment for identifying and/or editing portions of a video that contribute to video performance, according to certain embodiments of the present disclosure.

The present disclosure includes systems and methods for facilitating editing of video content by identifying portions of a video that contribute to the watchability or performance of the video. As explained above, existing techniques for evaluating video performance after-the-fact suffer from inaccuracy and computational efficiencies. Although machine learning-based predictor models can be used to predict the response of one or more viewers, these predictions do not provide information about why a certain prediction was made. Generally, a predictive model can provide a result as to the overall effectiveness of a video, but no insight as to what parts of the video contributed to the result. Thus, the editor has little guidance as to what parts of the video should be focused on to create an improved version of the video. Certain embodiments described herein address these shortcomings by using machine learning models to identify portions of a video that contribute to the performance of the video during an editing phase and provide an indication of such video portions of interest for use in editing the video. For instance, a neural network is applied to predict an initial performance metric for a video which represents a predicted viewer response to the video (e.g., the aggregated response of a set of viewers). A set of frames is perturbed to generate a perturbed video. The neural network is then applied to the perturbed video to compute a modified performance metric. If the initial and modified performance metrics are different (e.g., beyond some threshold level), then the perturbed frames are identified as contributing to the predicted viewer response to the video.

The following non-limiting example is provided to introduce certain embodiments. In this example, a video performance explainer system is coupled to a creator device. The user of the creator device is editing a video and seeks feedback on whether and how the video should be edited to improve the ultimate viewer response to the video. The user of the creator device provides an initial video to the video performance explainer system for processing.

Continuing with this example, the video performance explainer system computes, with a neural network, an initial performance metric for the video. The video performance explainer system uses the neural network to predict a value representative of a predicted viewer response to the video. For example, the initial performance metric can be scored on a scale from one to five, where videos with a performance metric of five are predicted to be most engaging to viewers, and videos with a performance metric of one are predicted to be least engaging to viewers.

In this example, the video performance explainer system then generates a perturbed video by perturbing a video portion of the initial video. For example, the video performance explainer system perturbs the video portion by replacing one or more frames in the video portion with different frames in the initial video, removing one or more frames in the video portion, and/or masking out one or more objects shown in the video portion. The video performance explainer system then computes a modified performance metric for the perturbed video with the neural network. The video performance explainer system compares the two performance metrics. Perturbing the video portion may cause the performance metric to increase or decrease. If there is a change in the two performance metrics (e.g., above a threshold level of change such as one point or two points), then the video performance explainer system determines, based on the difference between the initial and modified performance metrics, that the video portion contributed to a predicted viewer response to the initial video.

Continuing with this example, the video performance explainer system then provides an indication of the video portion as output. The indication can be provided to the creator device via a graphical interface, e.g., as a text indication indicating frame numbers or timestamps and/or a pictorial representation of the frames of the video at issue. The indication of the video portion is useable for modifying the initial video to affect the initial performance metric. The creator can focus editing on the identified portion of the video. Since the video performance explainer system has determined that changes to the identified portion of the video result in changes to the overall performance metric, edits to the identified portion of the video should impact the performance metric, and, ultimately, the response and engagement of viewers of the video once deployed.

As described herein, certain embodiments provide improvements over existing software tools for gauging viewer reaction to videos. As noted above, typically, the popularity or effectiveness of a video can only be measured once deployed, which is inefficient and time-consuming. Even when applying machine learning to predict the viewer response to a video, generally such a model is a black box that outputs a value without any explanation of what features or portions of the video are contributing to the value. Using the techniques described herein, video performance prediction can be explained by identifying key portions of the video that contribute to the performance metric.

Further, videos present a scalability issue when attempting to explain results of a predictor model. This is because digital videos are relatively large files with many frames, each frame containing a high resolution image. The processing required to analyze an image is propagated many times over when processing a video. Accordingly, the techniques described herein include removing or replacing entire frames of the video to apply the perturbation, which requires relatively low processing power in comparison to perturbing pixels within each frame. As a result, watchability predictions for a complex file such as a video can be computed on the order of seconds or minutes, so that a creator can receive feedback substantially in real time.

Additionally or alternatively, certain embodiments provide improvements over existing software tools for editing content. For instance, existing software tools require users, using an editing tool executed on a computer, to guess which parts of a video are associated with a predicted or expected viewer response. Relying on such guessing can cause the creator to blindly edit portions and check for results, which can expend a great deal of time and computing resources. Embodiments described herein can facilitate an automated process for suggesting edits to content that avoids this reliance on subjective, manual determinations by a user. For instance, the combination of a machine-learning model coupled with the structural features of a user interface (e.g., suggestions or other indicators of potential edits to improve the watchability of a video) improves the functionality of an editing tool. These features can reduce the manual, subjective effort involved with identifying portions of a video to focus on in existing content editing tools.

Example of an Operating Environment for Explainable Video Performance Prediction FIG. 1 depicts an example of a computing environment 100 in which content editing tools use machine learning models to indicate portions of a video that contribute to the performance of the video, which may be used to focus the editing of the video. The computing environment 100 includes a creator device 102 that is used to edit a video via a graphical interface 104 and a video performance explainer system 110 that is used to analyze performance of the video.

The video performance explainer system 110 includes a frame selection subsystem 112, a perturbation subsystem 114, a frame analysis subsystem 118, and a performance prediction subsystem 116.

The various subsystems of the video performance explainer system 110 can be implemented in the same computing system or different, independently operated computing systems. For example, the frame selection subsystem 112 could be separate entity from the perturbation subsystem 114, the performance prediction subsystem 116, and the frame analysis subsystem 118, or the same entity. Different, independently operating graphical interfaces 104 can communicate with the video performance explainer system 110, or the video performance explainer system 110 can itself provide the graphical interface 104.

While the system of FIG. 1 can be used, other embodiments can involve the video performance explainer system 110 being built into a software application executed on the creator device 102, e.g., as a plug-in to video editing software.

Some embodiments of the computing environment 100 include a creator device 102. The creator device 102 is a device used by a user to edit and/or request performance analysis of a video. The user of the creator device 102 may be someone that is creating and/or editing a video, and is referred to herein as a "creator." Examples of a creator device include, but are not limited to, a personal computer, a tablet computer, a desktop computer, a processing unit, any combination of these devices, or any other suitable device having one or more processors. A user of the creator device 102 interacts with the graphical interface 104 to edit videos and/or provide videos to the video performance explainer system 110 for analysis. The graphical interface 104 may include upload elements (not shown) for uploading a video. The graphical interface 104 may include an element (such as a button) for initiating video performance explainer system 110 analysis of an initial video 109. This may, in some cases, initiate upload of the initial video 109 or otherwise providing the initial video to the video performance explainer system 110.

The creator device 102 is communicatively coupled to the video performance explainer system 110 via a data network. Examples of the data network include, but are not limited to, internet, local area network ("LAN"), wireless area network, wired area network, wide area network, and the like.

The graphical interface 104 is an interface such as a graphical user interface (GUI) which is capable of displaying and receiving information. The graphical interface 104 includes guidance elements 106, which are used to display information about video performance generated by the video performance explainer system 110. In some embodiments, the graphical interface 104 further includes editing elements 108 that can be used to edit videos.

The video performance explainer system 110 is configured to analyze performance of a video (e.g., a predicted viewer response to a given video), and to explain the performance by identifying portions of the video that contribute to the performance. The video performance explainer system 110 includes frame selection subsystem 112, perturbation subsystem 114, performance prediction subsystem 116, and frame analysis subsystem 118.

The frame selection subsystem 112 identifies portions of a video. In some embodiments, the frame selection subsystem 112 identifies a portion of a video that includes a set of temporally contiguous frames, as further described below with respect to FIGS. 2 and 3. Information about the identified portion of the video is passed to the perturbation subsystem 114 for further processing.

The perturbation subsystem 114 applies a perturbation to a portion of a video (e.g., as selected by the frame selection subsystem 112). In some embodiments, the perturbation subsystem 114 perturbs a frame of the video by replacing the frame with another frame, as further described below with respect to FIGS. 2 and 3. Alternatively, or additionally, the perturbation 114 may perturb a frame by removing the frame, replacing the frame with a blank frame, and/or masking out one or more objects in the frame. The perturbation subsystem 114 passes the perturbed video including the perturbed frame(s) to the performance prediction subsystem 116 for further processing.

The performance prediction subsystem 116 computes a performance metric for a video. In some embodiments, the performance prediction subsystem 116 computes multiple performance metrics for a given video using a neural network, as further described below with respect to FIGS. 2 and 3. For example, the performance prediction subsystem 116 computes an initial performance metric for a video before perturbation by the perturbation subsystem 114, and a modified performance metric for the video after perturbation by the perturbation subsystem 114. The performance prediction subsystem 116 passes the performance metrics to the frame analysis subsystem 118 for further processing.

The frame analysis subsystem 118 compares the initial performance metric to the modified performance metric. If the performance metrics differ beyond some threshold level, then the frame analysis subsystem 118 determines that the perturbed frames have some appreciable effect on the performance of the video. In this case, the perturbed frames are identified as frames of interest. In some embodiments, the frame analysis subsystem 118 generates an indication of the frames of interest 120. The indication of the frames of interest 120 informs a creator which frames have an impact on the performance of the video. The indication of the frames of interest 120 may, for example, indicate frame numbers, timestamps in the video, a visual presentation of the portion of the video identified, and so forth. The frame analysis subsystem 118 transmits the indication of frames of interest 120 to guidance elements 106 of the graphical interface 104 of the creator device 102.

The user of the creator device 102 can identify the frames of interest, based on the indication of the frames of interest 120 presented via guidance elements 106. Responsive to the indication of the frames of interest 120, the creator can use the editing elements 108 to edit the initial video 109 to generate an edited video 122. The creator may, for example, remove the frames of interest 120 or replace the frames of interest 120 with other frames if the frames of interest have a negative effect on video performance. If the frames of interest have a positive effect on video performance, then the creator may use more frames of this type. For example, if the inclusion of frames showing a cat greatly improve the performance metric, then the creator may edit more footage into the video that includes cats.

Schematic Diagram for Explainable Video Performance Prediction

Figure 2:
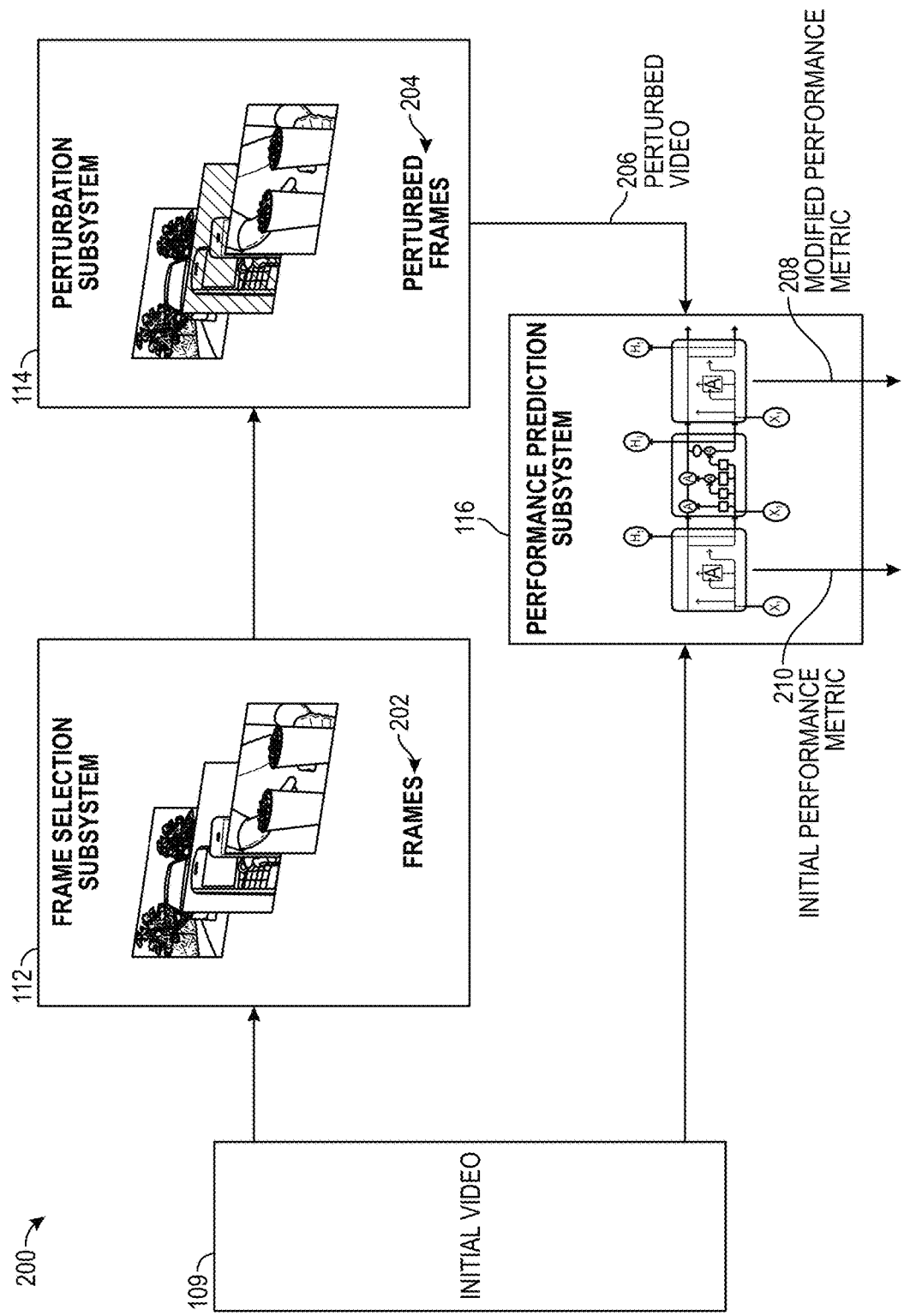
FIG. 2 depicts an example of operations performed by the computing environment of FIG. 1 to identify the portions of the video that contribute to performance, according to certain embodiments of the present disclosure.

FIG. 2 depicts a schematic diagram 200 illustrating operations performed by components of the video performance explainer system 110. An initial video 109 is provided as input to the frame selection subsystem 112 and the performance prediction subsystem 116.

In some embodiments, the frame selection subsystem 112 identifies frames 202 in the initial video 109. The frames are connected in some way such that the identified frames 202 represent a portion of the video for analysis. For example, the frames 202 are temporally contiguous. Alternatively, or additionally, the frames include similar objects (e.g., a cup of coffee, a cat, a celebrity, and so forth). The frame selection subsystem 112 may analyze the video to identify the frames 202 as described in further detail below with respect to FIG. 3.

In some embodiments, the perturbation subsystem 114 perturbs the frames 202 identified by the frame selection subsystem 112 to generate perturbed frames 204. For example, the perturbation subsystem 114 perturbs a frame by replacing a frame (e.g., in the portion of the video selected by the frame selection subsystem 112) by another frame of the video. As another example, the perturbation subsystem 114 perturbs a frame by removing the frame. As another example, the perturbation subsystem 114 perturbs a frame by blanking out the frame. As another example, the perturbation subsystem 114 perturbs a frame by masking out one or more objects in the frame. Once one or more frames are perturbed, a perturbed video 206 is generated (e.g., a perturbed version of the initial video).

The performance prediction subsystem 116 computes performance metrics for the video. In some embodiments, the performance prediction subsystem computes the performance metrics using a machine learning algorithm such as a neural network. As a specific example, a neural network is applied to the initial video 109 to compute an initial performance metric 210. The neural network is applied to the perturbed video 206 to generate a modified performance metric 208. In some embodiments, the neural network is a long short term memory (LSTM) network. Computing the performance metrics is described in further detail below with respect to FIG. 3.

In some embodiments, the performance prediction subsystem 116 outputs the initial performance metric 210 and the modified performance metric 208 to the frame analysis subsystem 118. The frame analysis subsystem then compares the performance metric to identify whether the perturbed frames appreciably contributed to the performance metric of the initial video 109, as described in further detail with respect to FIGS. 1 and 3.

Examples of Operations for Explainable Video Performance Prediction

Figure 3:
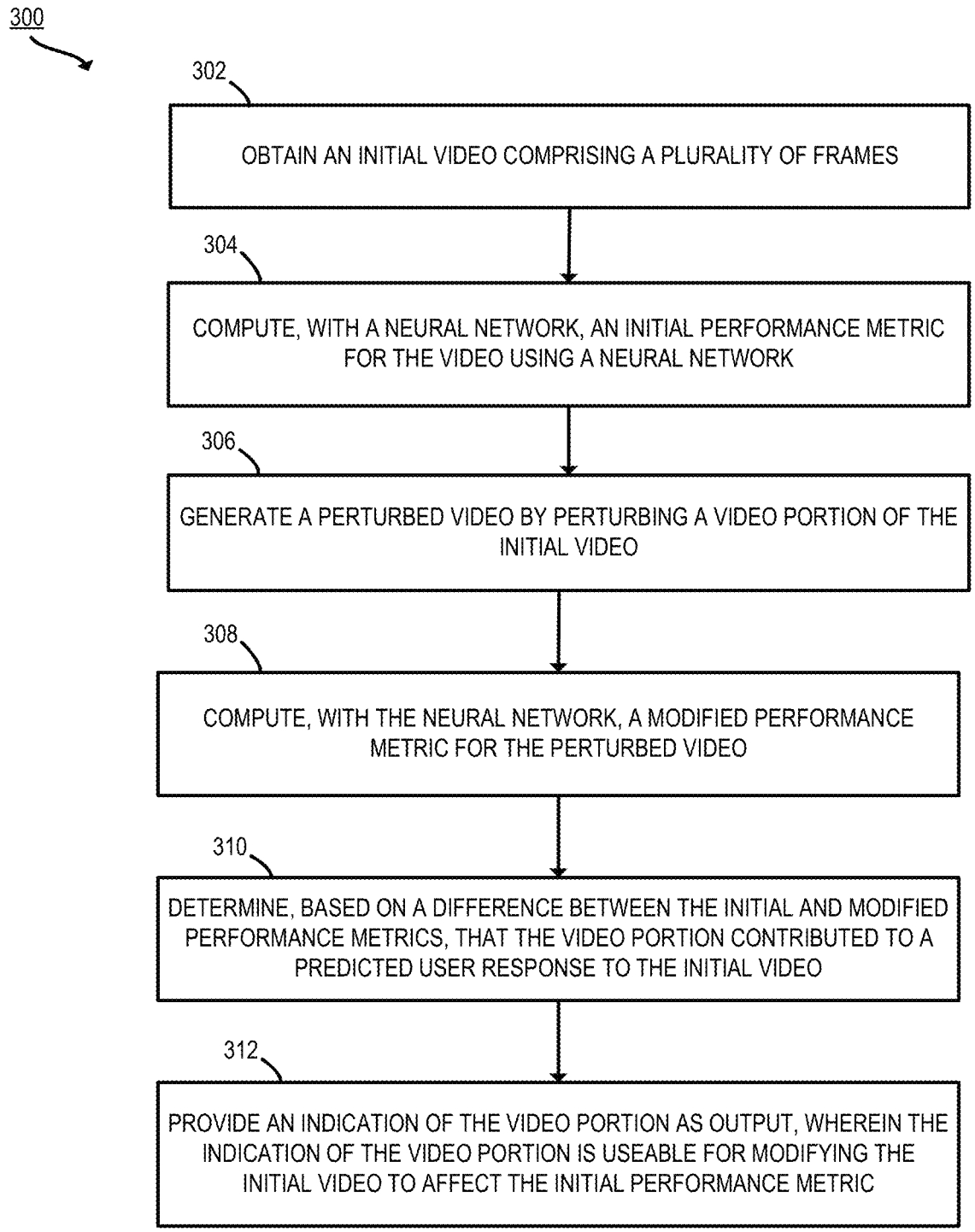
FIG. 3 depicts an example of a process for identifying portions of a video that contribute to video performance, according to certain embodiments of the present disclosure.

FIG. 3 depicts an example of process 300 for updating an interface of a content editing tool to indicate portions of a video that contribute to a predicted viewer response to the video, which can be used to edit the video for improved viewer response. In this example, the video performance explainer system 110 receives an initial video 109 from the creator device 102. The initial video 109 is processed in a pipeline including the frame selection subsystem 112, perturbation subsystem 114, performance prediction subsystem 116, and frame analysis subsystem 118. If the video performance explainer system 110 determines that a portion of the initial video contributed to a predicted viewer response, then the video performance explainer system 110 provides an indication of the identified video portion back to the creator device 102 as output. Alternatively, or additionally, in other embodiments, the video performance explainer system can be executed as part of a software application executed on the creator device, where the software application can perform one or more of blocks 304-312. In some embodiments, one or more processing devices implement operations depicted in FIG. 3 by executing suitable program code. For illustrative purposes, the process 300 is described with reference to certain examples depicted in the figures. Other implementations, however, are possible.

At block 302, the video performance explainer system obtains an initial video comprising a plurality of frames. In some aspects, the video performance explainer system retrieves the initial video from creator device 102 over a network. The video performance explainer subsystem may retrieve the initial video responsive to detecting user interaction with an interface element (e.g., a button of the graphical interface labeled "predict viewer response" or "identify frames for editing to improve video.").

A processing device executes program code of the video performance explainer system 110 to implement block 302. For example, the program code for the video performance explainer system 110, which is stored in a non-transitory computer-readable medium, is executed by one or more processing devices.

At block 304, the performance prediction subsystem computes, with a neural network, an initial performance metric for the video. In some aspects, the neural network is trained to predict viewer response to the video and output a value representative of the predicted viewer response. For example, the performance prediction subsystem computes an initial performance metric which rates the predicted viewer response on a scale from one to ten, with ten being for a video most engaging to a viewer and one being for a video least engaging to a viewer. Such a neural network may be trained using pairs of video frames or sets of video frames, along with ratings given by a viewer. Alternatively, or additionally, other algorithms may be used to compute the initial performance metric, such as a regression model or decision tree.

In some embodiments, the initial performance metric is computed by generating a vector representation of the initial video using a convolutional neural network and computing the modified performance metric by, at least, applying a long short term memory (LSTM) network to the vector representation. The performance prediction subsystem uses a convolutional neural network includes convolutional layers, pooling layers, concatenation layers, dropout layers, fully connected layers, and softmax layers trained to identify visual features and generate a feature vector representative of the identified visual features (e.g., the vector representation of the initial video).

In one or more embodiments, the performance prediction subsystem generates the feature vector by passing the video frames through the convolutional neural network. In some aspects, the performance prediction subsystem identifies the feature vector from the last hidden layer of the convolutional neural network. The convolutional neural network obtains a rectifier linear unit (ReLu) activation of the last hidden layer (e.g., the layer prior to a classification layer of the convolutional neural network). By passing the video frames through the convolutional neural network in this way, the performance prediction subsystem can generate a dimensional feature vector (e.g., a 2048-dimensional vector) representative of the video.

In one or more embodiments, the visual feature vector reflects latent features generated by a neural network (e.g., the convolution neural network) at different levels of abstraction, and therefore, is not capable of being interpreted, analyzed, or understood by a human.

In some aspects, upon generating the visual feature vector (e.g., the vector representation of the initial video), the performance prediction subsystem generates a performance metric, based on the value(s) of the vector representation. For example, the performance prediction subsystem includes a neural network (deep learning model) trained to analyze the vector representation of the initial video to determine a performance metric representative of predicted responses of viewers upon viewing the initial video. For example, in one or more embodiments, the performance prediction subsystem uses a recurrent neural network to compute the initial performance metric. Specifically, the performance prediction subsystem can utilize a bidirectional long short term memory (LSTM) network with a softmax output layer trained to generate the initial performance metric based on values of the vector representation of the initial video.

In some aspects, the performance prediction subsystem uses an LSTM architecture to account for sequential data (e.g., sequential frames) in analyzing input (e.g., an input digital video). To illustrate, the LSTM network can include a number of blocks (sometimes referred to as "context units" or simply "units") that each analyze a different frame of an input digital video while preserving its sequential order. Each block generates an output vector as well as a latent vector that the performance prediction subsystem passes to an adjacent block that corresponds to a next video frame in the sequence. Thus, by utilizing the LSTM architecture in a recurrent neural network, the performance prediction subsystem considers temporal dependency between frames. Accordingly, the output of each block is based not only on its respective input frame, but also on the latent vectors received from adjacent blocks. Additionally, in embodiments where the performance prediction subsystem utilizes a bidirectional LSTM, the performance prediction subsystem passes latent vectors between LSTM blocks in both directions in the context of the sequence of video frames.

For example, the performance prediction subsystem includes a recurrent neural network trained to classify an input digital videos into classes. For instance, the performance prediction subsystem classifies an input digital video into classes 1-5, where each class corresponds to a particular performance level. As a specific example, if the video is an advertisement, the performance metric is a function of conversation rate (e.g., level 1 corresponds to 1% conversion rate, level 2 corresponds to 2% conversion rate, etc.). The performance prediction subsystem can apply the LSTM network to the vector representation of the initial video to generate a predicted classification (e.g., level 3) as the initial performance metric.

Alternatively, or additionally, the performance metric includes a distribution of predicted values for one or more potential viewers of the initial video. For example, in addition to (or in the alternative to) the predicted classification (e.g., level 3) the performance prediction subsystem computes a probability distribution. For instance, the performance prediction subsystem computes a probability distribution that represents a predicted classification (e.g., 10% probability of level 1, 20% probability of level 2, 55% probability of level 3, 10% probability of level 4, and 5% probability of level 5).

At block 306, the video performance explainer system generates a perturbed video by perturbing a video portion of the initial video. In some aspects, the frame selection subsystem first identifies the video portion of the initial video (e.g., comprising one or more frames of the initial video), which is then provided to the perturbation subsystem for perturbation.

In some embodiments, the video portion includes a set of frames that are temporally contiguous (e.g., the frames are adjacent in time). In some embodiments, the frame selection subsystem identifies the video portion by applying temporal segmentation or temporal clustering to the set of frames that are temporally contiguous.

For example, the frame selection subsystem uses a histogram of optical flow features to cluster video frames to divide the video into "superframes" that are both temporally contiguous and contain related motion or other visual aspects. For example, a first superframe is a set of frames corresponding to a shot of a person running, and a second superframe is a set of frames corresponding to a shot of someone laying down. Temporal segmentation techniques are described in detail in Sokeh, Hajar & Argyriou, Vasileios & Monekosso, Dorothy & Remagnino, Paolo, *Superframes, A Temporal Video Segmentation*, 10.1109/ICPR.2018.8545723 pp. 566-571 (2018).

Alternatively, or additionally, the frame selection subsystem identifies the video portion using greedy temporal clustering using a perceptual hash as a similarity measure. Perceptual hashes map an image to a string based on the appearance of the image, such that two images that look the same map to the same hash value, even if there are bit-level differences between the images. (See, e.g., Zauner, Christoph. "Implementation and Benchmarking of Perceptual Image Hash Functions," available at https://www.phash.org/docs/pubs/thesis_zauner.pdf (2010)).

Alternatively, or additionally, the frame selection subsystem may identify the video portion using spatio-temporal segmentation. In spatio-temporal segments, each frame in a set of temporally contiguous frames is further divided into multiple sets of related pixels. Alternatively, or additionally, the frame selection subsystem identifies the video portion based on determining that a common object is depicted in multiple frames of the video portion. This may be executed, for example, using deep learning-based object tracking, as described in Ciaparrone et al., *Deep Learning in Video Multi-Object Tracking: A Survey*, arXiv: 1907.12740 (2019).

In some embodiments, the perturbation subsystem perturbs the video portion in the initial video by replacing a frame in the video portion with a different frame from the initial video. The perturbation subsystem can perturb each frame in the video portion in turn (e.g., replacing multiple frames in the video portion with different frames of the initial video).

In some aspects, the perturbation subsystem replaces one or more frames in the video portion with the first frame of the selected video portion. Alternatively, or additionally, the frames in the video portion are replaced with the last frame of the selected video portion. As another example, in a random perturbation approach, the perturbation subsystem replaces the frames in the video portion with random frames sampled from the video.

Alternatively, or additionally, the perturbation subsystem replaces the frames in the video portion with a blank frame (e.g., a white frame, a black frame, or a grey frame without sound). Alternatively, or additionally, the perturbation subsystem removes the frames in the video portion entirely. Alternatively, or additionally, the perturbation subsystem masks out one or more objects in the video portion to perturb the video portion.

A processing device executes program code of the video performance explainer system 110 to implement block 306. For example, the program code for the perturbation subsystem 114, which is stored in a non-transitory computer-readable medium, is executed by one or more processing devices.

At block 308, the performance prediction subsystem computes, with a neural network, a modified performance metric for the perturbed video. The performance prediction subsystem computes the modified performance metric in a similar fashion as computing the initial performance metric, as described above with respect to block 304. Accordingly, the performance prediction subsystem computes different performance metrics for an initial video and a perturbed version of the initial video.

At block 310, the frame analysis subsystem determines, based on a difference between the initial and modified performance metrics, that the video portion contributed to a predicted viewer response to the initial video. For example, the frame analysis subsystem subtracts the performance metrics to determine a difference between the two performance metrics. As a specific example, the initial performance metric is 3 and the modified performance metric is 4. The difference is 1. In some aspects, this computed difference is compared to a threshold value. The frame analysis subsystem may initially configure some threshold indicative of a change of significance (e.g., greater than 0.5, 1, or 2). If the difference between the initial and modified performance metrics exceeds the threshold, then the frame analysis subsystem determines that the video portion contributed to a predicted viewer response to the initial video. For example, the presence of something pleasant such as a puppy increases the predicted viewer response, while the presence of something unpleasant such as blood decreases the predicted viewer response.

In some aspects, video portions are perturbed in turn and the operations of blocks 306-310 are repeated. For example, the video performance explainer system sequentially scans the video in one direction (e.g., left to right) and perturbs one video portion at a time. When a video portion is perturbed, the video performance explainer system determines the change in the performance metric. For example, the video performance explainer system perturbs a second video portion to generate a second perturbed video, and computes a second modified performance metric based on the second perturbed video. If there is no change in the performance metric, or if the change is below the threshold value, then the video performance explainer system perturbs two contiguous video portions and repeats blocks 308 and 310. The video performance prediction system continues increasing number of video portions to perturb until the change in the performance metric exceeds the threshold.

At block 312, the frame analysis subsystem provides an indication of the video portion as output. The indication of the video portion is useable for modifying the initial video to affect the initial performance metric. In some embodiments, the frame analysis subsystem provides the indication of the video portion to the creator device over a network. The indication can, for example, be in the form of displaying the video portion in a highlighted fashion on the graphical interface on the creator device, as shown in FIGS. 4B and 4C. Alternatively, or additionally, the indication of the video portion can be in text form (e.g., the graphical interface displays timestamps specifying the video portion).

Based on the indication of the video portion, the creator can modify the initial video to affect (e.g., improve) the initial performance metric. For example, the creator may remove the video portion in whole or in part if the video portion reduces the performance metric. Accordingly, the techniques described herein can guide the creator to produce a video which is predicted to have an improved viewer response, as compared to the initial video presented to the system.

In some aspects, the video performance explainer system itself provides an interface for modifying the initial video to affect the performance metric, along with indication of the video portion that contributed to the predicted viewer response. The creator can edit the video and receive feedback on the predicted performance using a single interface for a smooth user experience.

Example Graphical User Interfaces For Explainable Video Performance Prediction

Figure 4A:
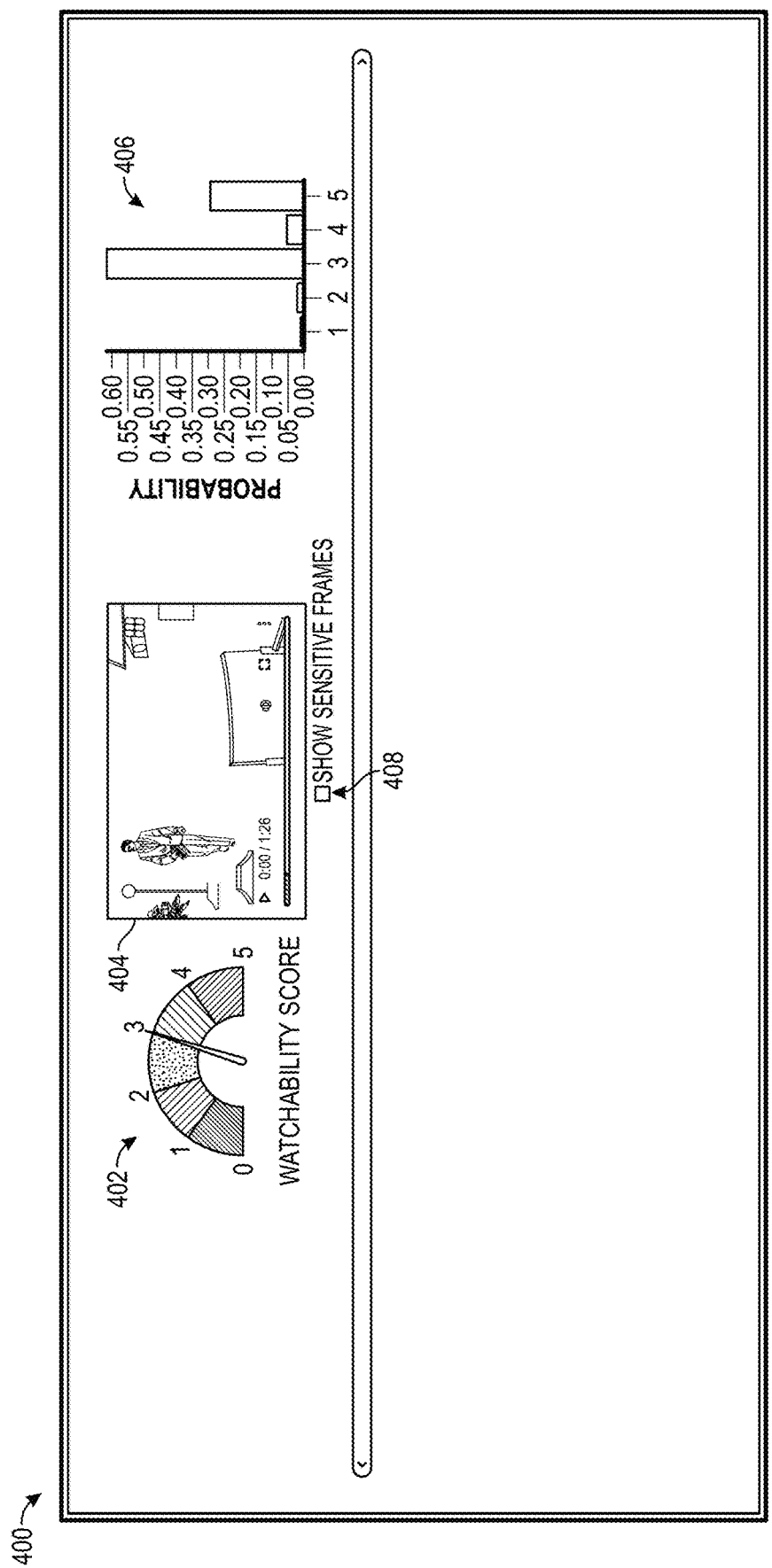
FIGS. 4A-4C illustrate an example of a sequence of graphical interface views, according to certain embodiments of the present disclosure.
Figure 4B:
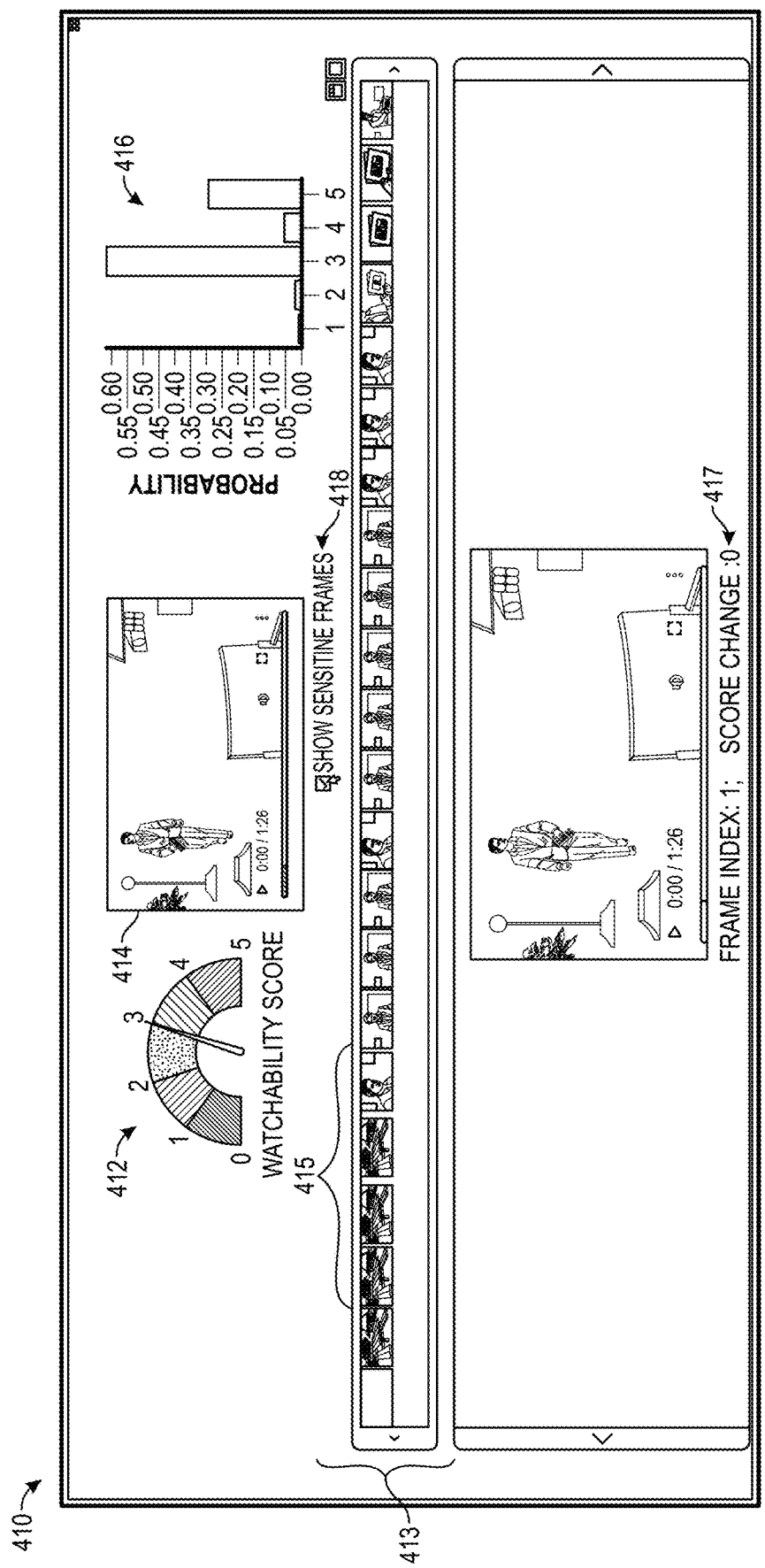
Figure 4C:
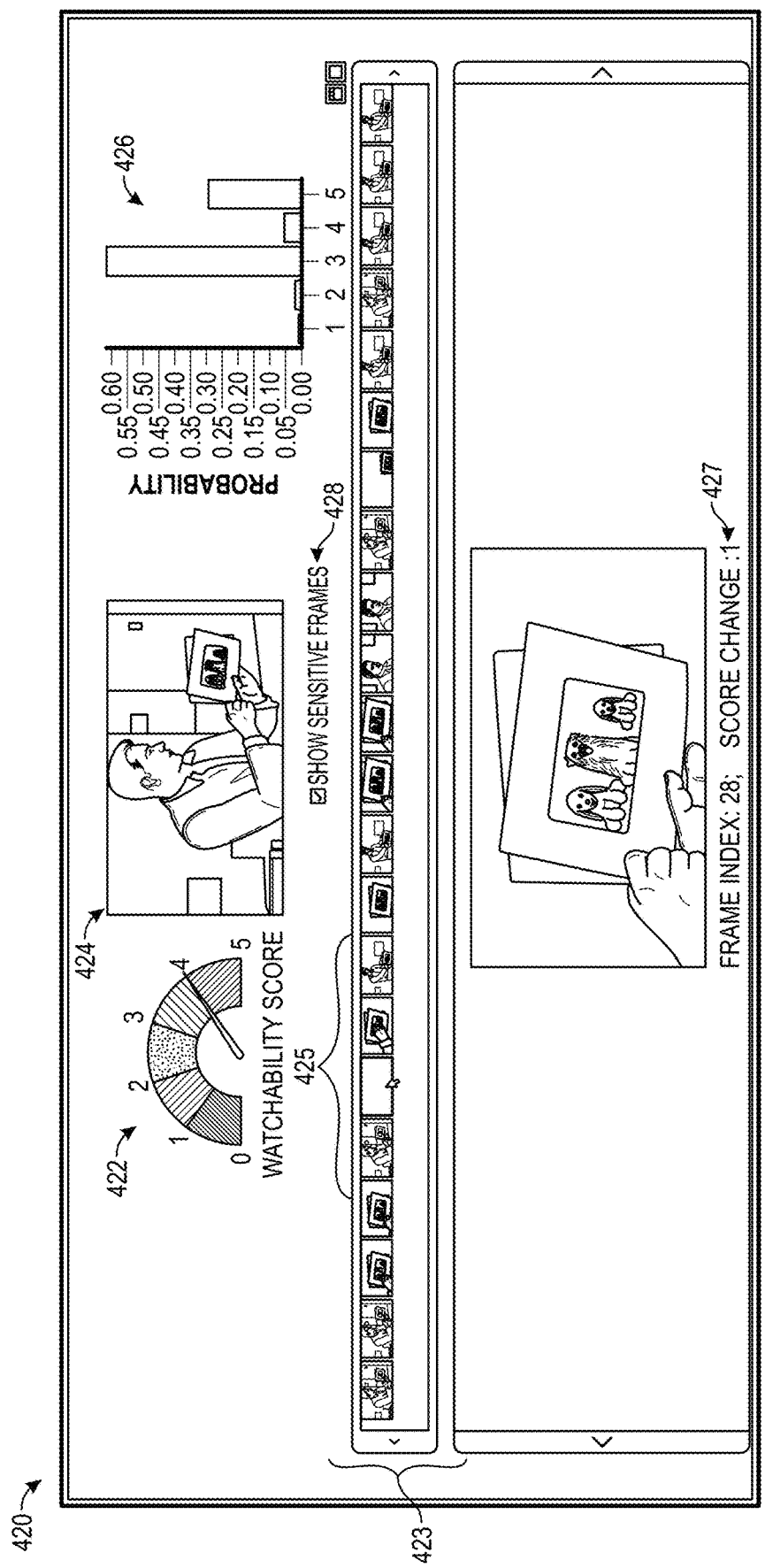

FIGS. 4A-4C depict examples of graphical interface views 400-420 according to certain embodiments of the present disclosure. In some aspects, the graphical interface 104 of FIG. 1 includes an online content editing tool that a creator can interact with to edit a video and request information about sensitive frames that contribute to predicted viewer response to the video. The video is analyzed as described herein to display indications of the video portions of interest via the graphical interface 104 as shown in graphical interface views 400-420.

FIG. 4A illustrates an example of a graphical interface view 400. The graphical interface view 400 includes an indication of a watchability score 402, a video 404, a probability distribution 406 for the watchability score, and an element 408 labeled "show sensitive frames." The interface view 400 displays a watchability score (e.g., an initial performance metric) for the video 404. The probability distribution 406 illustrates a probability that the watchability score 402 is each of five discrete values from one to five. Responsive to user interaction with the element 408 labeled "show sensitive frames," the video performance explainer system can identify frames that have an effect on the performance metric when perturbed, as described herein. Detecting user interaction with the element 408 can cause the graphical interface view 400 view to transition to graphical interface view 410.

FIG. 4B illustrates an example of another graphical interface view 410. The graphical interface view 410 includes an indication of a watchability score 412, a video 414, a probability distribution 416 for the watchability score, and an element 418 labeled "show sensitive frames." In this case, the element 418 for the sensitive frames has been selected. The graphical interface view 410 further includes frames 413 and indicators of sensitive frames 415. In this example, the sensitive frames (e.g., the portion of the video that contributed to a predicted viewer response to the initial video) are indicated with boxes around the sensitive frames. Further indication of the portion of the video that contributed to the predicted viewer response to the initial video is provide via text indication 417. The text indication 417 shows a frame index and a score change. The frame index indicates the frames that are highlighted, and the score change indicates the change in the performance metric based on perturbing the frames. In this case, the score change is zero.

FIG. 4C illustrates another example of a graphical interface view 420. The graphical interface view 420 includes an indication of a watchability score 422, a video 424, a probability distribution 426 for the watchability score, and an element 428 labeled "show sensitive frames." In this case, the element 428 for the sensitive frames has been selected. The graphical interface view 420 further includes frames 423 and indicators of sensitive frames 425. In this example, the sensitive frames (e.g., the portion of the video that contributed to a predicted viewer response to the initial video) are indicated with boxes around the sensitive frames. Further indication of the portion of the video that contributed to the predicted viewer response to the initial video is provide via text indication 427. The text indication 427 shows a frame index and a score change. The frame index indicates the frames that are highlighted, and the score change indicates the change in the performance metric based on perturbing the frames. In this case, the score change is one. This is also seen in the watchability score 422, which has increased from 3 to 4.

A user can use the graphical interface views 400, 410, and 420 of FIGS. 4A-4C to identify sensitive frames, i.e., a video portion that contributes to a predicted viewer response to the initial video. The creator can then focus on this video portion in editing the video. Using the graphical interface views 400, 410, and 420 of FIGS. 4A-4C, the user can identify portions of the video that contribute most to the performance metric and predicted viewer response. The editor can then focus editing on these frames or similar frames. This can result in a video that is more likely to have a positive viewer response, and ultimately be more popular and garner more views or conversions.

Example of a Computing System for Explainable Video Performance Prediction

Figure 5:
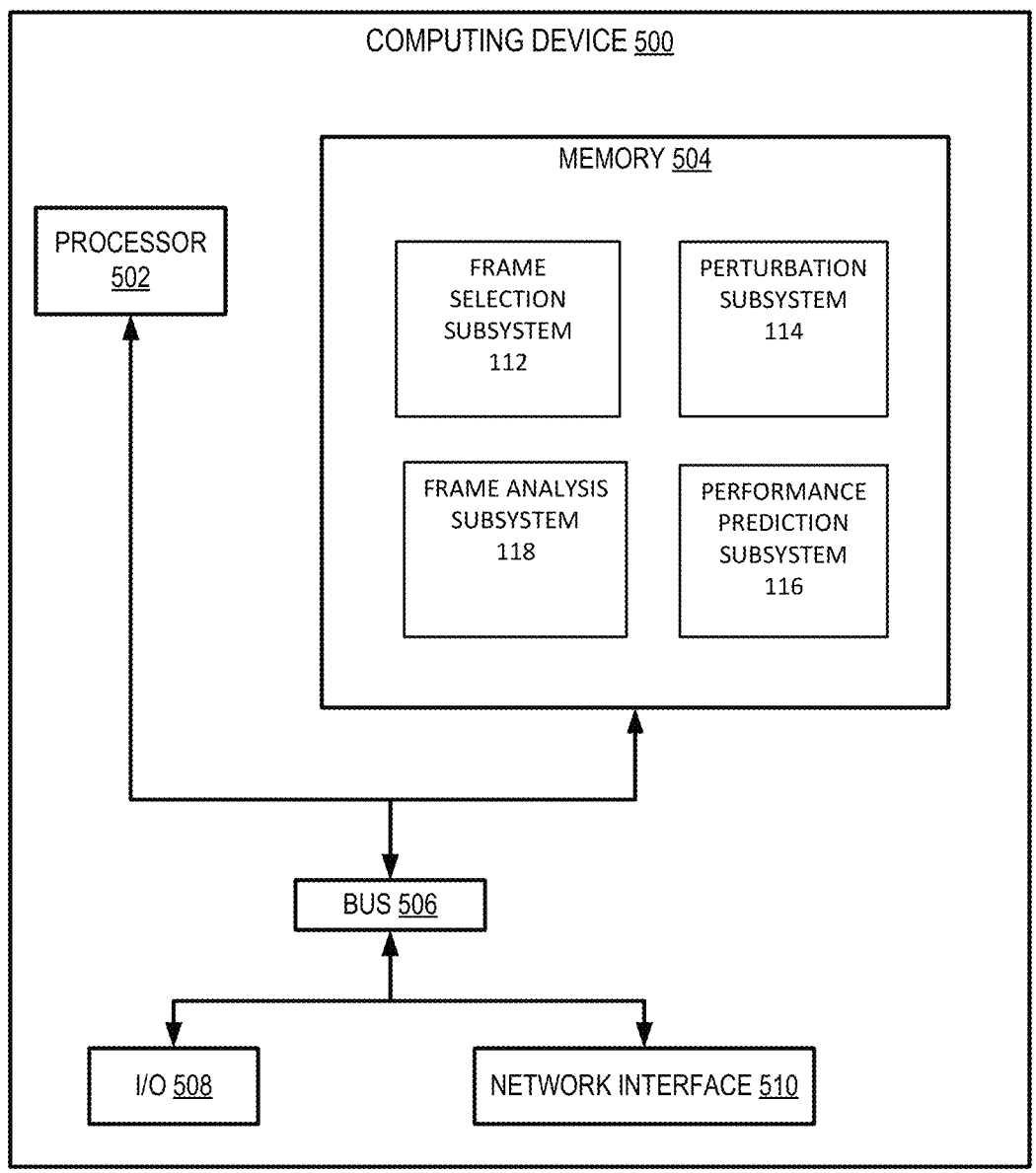
FIG. 5 depicts an example of a computing system that performs certain operations described herein, according to certain embodiments of the present disclosure.

Any suitable computing system or group of computing systems can be used for performing the operations described herein. For example, FIG. 5 depicts examples of computing system 500 that executes a performance prediction subsystem 116. In some embodiments, the computing system 500 also executes a frame selection subsystem 112, a perturbation subsystem 114, and a frame analysis subsystem 118 as depicted in FIG. 1. In other embodiments, a separate computing system having devices similar to those depicted in FIG. 5 (e.g., a processor, a memory, etc.) executes one or more of the subsystems 112-116.

The depicted examples of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, such as input or output devices. For example, the computing system 500 is shown with one or more input/output ("I/O") interfaces 508. An I/O interface 508 can receive input from input devices or provide output to output devices. One or more buses 506 are also included in the computing system 500. The bus 506 communicatively couples one or more components of a respective one of the computing system 500.

The computing system 500 executes program code that configures the processor 502 to perform one or more of the operations described herein. The program code includes, for example, the performance prediction subsystem 116, the perturbation subsystem 114, or other suitable applications that perform one or more operations described herein. The program code may be resident in the memory device 504 or any suitable computer-readable medium and may be executed by the processor 502 or any other suitable processor. In some embodiments, both the performance prediction subsystem 116 and the perturbation subsystem 114 are stored in the memory device 504, as depicted in FIG. 5. In additional or alternative embodiments, one or more of the performance prediction subsystem 116 and the perturbation subsystem 114 are stored in different memory devices of different computing systems. In additional or alternative embodiments, the program code described above is stored in one or more other memory devices accessible via a data network.

The computing system 500 can access the data used by the perturbation subsystem 114 and the performance prediction subsystem 116 in any suitable manner. In some embodiments, some or all of one or more of these data sets, models, and functions are stored in the memory device 504, as in the example depicted in FIG. 5. For example, a computing system 500 that executes the performance prediction subsystem 116 can access training data stored by an external system.

In additional or alternative embodiments, one or more of these data sets, models, and functions are stored in the same memory device (e.g., one of the memory device 504). For example, a common computing system, such as the video performance explainer system 110 depicted in FIG. 1, can host the perturbation subsystem 114 and the performance prediction subsystem 116 as well as the training data. In additional or alternative embodiments, one or more of the programs, data sets, models, and functions described herein are stored in one or more other memory devices accessible via a data network.

The computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and the like. The computing system 500 is able to communicate with one or more other computing devices (e.g., a computing device executing a graphical interface 104 as depicted in FIG. 1) via a data network using the network interface device 510.

Figure 6:
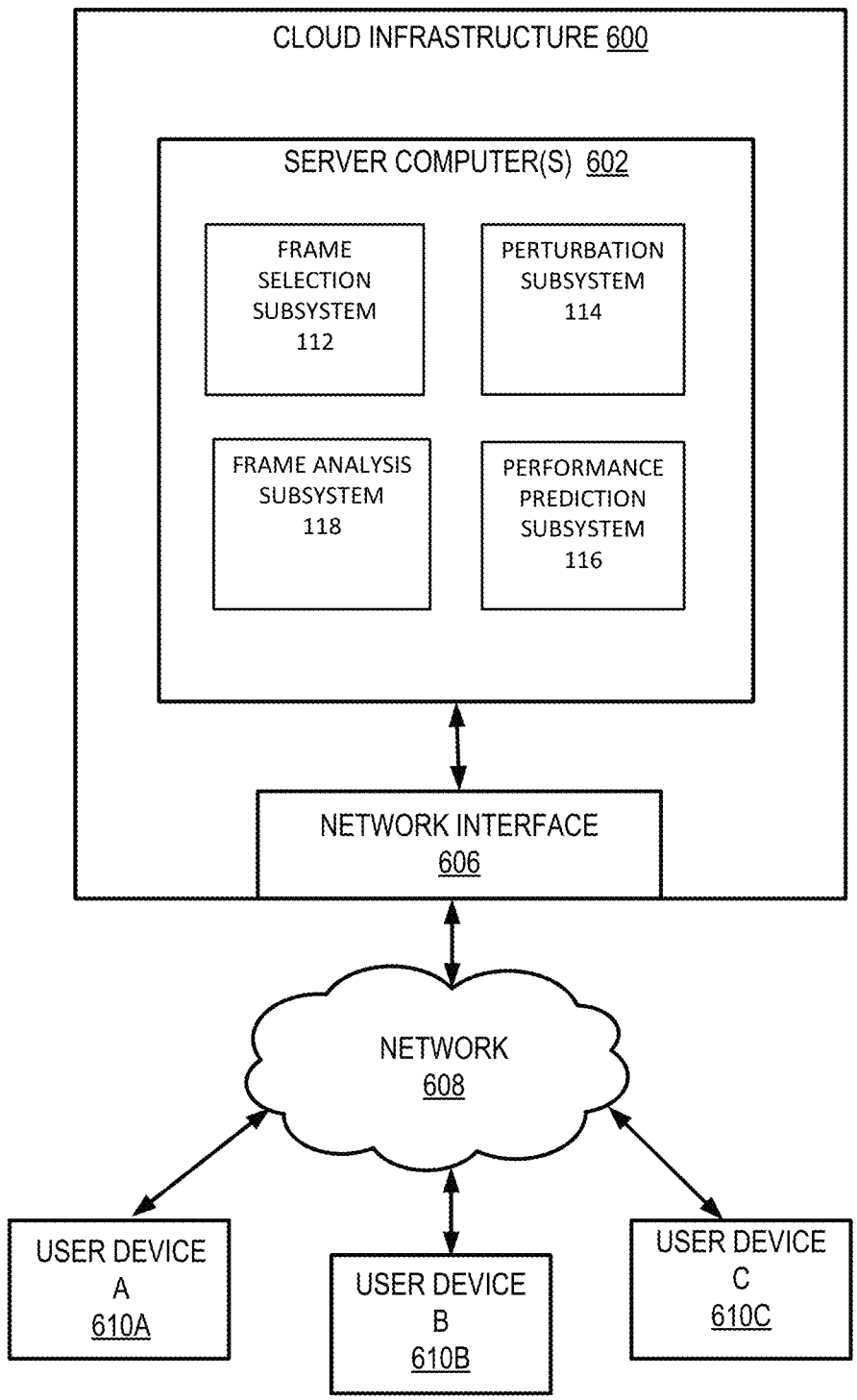
FIG. 6 depicts an example of a cloud computing environment that performs certain operations described herein, according to certain embodiments of the present disclosure.

In some embodiments, the functionality provided by the computing system 500 may be offered via a cloud-based service provided by a cloud infrastructure 600 provided by a cloud service provider. For example, FIG. 6 depicts an example of a cloud infrastructure 600 offering one or more services including a service that offers virtual object functionality as described in this disclosure. Such a service can be subscribed to and used by a number of user subscribers using user devices 610A, 610B, and 610C across a network

608. The service may be offered under a Software as a Service (SaaS) model. One or more users may subscribe to such as service.

In the embodiment depicted in FIG. 6, the cloud infrastructure 600 includes one or more server computer(s) 602 that are configured to perform processing for providing one or more services offered by the cloud service provider. One or more of server computer(s) 602 may implement a frame selection subsystem 112, a perturbation subsystem 114, a performance prediction subsystem 116, and/or a frame analysis subsystem 118 as depicted in FIG. 1. The subsystems 112-118 may be implemented using software only (e.g., code, program, or instructions executable by one or more processors provided by cloud infrastructure 600), in hardware, or combinations thereof. For example, one or more of the server computer(s) 602 may execute software to implement the services and functionalities provided by subsystems 112-118, where the software, when executed by one or more processors of the server computer(s) 602, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 602 can include volatile memory, non-volatile memory, or a combination thereof.

In the embodiment depicted in FIG. 6, cloud infrastructure 600 also includes a network interface device 606 that enables communications to and from cloud infrastructure 600. In certain embodiments, the network interface device 606 includes any device or group of devices suitable for establishing a wired or wireless data connection to the network 608. Non-limiting examples of the network interface device 606 include an Ethernet network adapter, a modem, and/or the like. The cloud infrastructure 600 is able to communicate with the user devices 610A, 610B, and 610C via the network 608 using the network interface device 606.

A graphical interface (e.g., graphical interface 104 as depicted in FIG. 1) may be displayed on each of the user devices user device A 610A, user device B 610B, and user device C 610C. A user of user device 610A may interact with the displayed graphical interface, for example, to enter text data and upload media files. In response, processing for identifying and displaying indications of video portions may be performed by the server computer(s) 602. Responsive to these alerts, the user may again interact with the graphical interface to edit the video.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
computing, with a neural network, an initial performance metric for an initial video; generating a perturbed video by perturbing a video portion of the initial video by modifying frames of the video portion; computing, with the neural network, a modified performance metric for the perturbed video; determining, based on a difference between the initial and modified performance metrics, that the video portion contributed to a predicted viewer response to the initial video; and providing an interface for modifying the initial video to affect the initial performance metric, the interface including an indication of the video portion that contributed to the predicted viewer response.

2. The method of claim 1, wherein the video portion includes a set of frames that are temporally contiguous.

3. The method of claim 2, further comprising identifying the video portion by applying temporal segmentation or temporal clustering to the set of frames that are temporally contiguous.

4. The method of claim 1, further comprising identifying the video portion based on determining that a common object is depicted in multiple frames of the video portion.

5. The method of claim 1, wherein perturbing the video portion in the initial video by modifying the frames of the video portion comprises replacing the frames in the video portion with different frames of the initial video.

6. The method of claim 5, further comprising:
perturbing a second video portion to generate a second perturbed video; and
computing a second modified performance metric based on the second perturbed video.

7. The method of claim 1, wherein perturbing the video portion in the initial video by modifying the frames of the video portion comprises masking out one or more objects in multiple frames of the video portion.

8. The method of claim 1, wherein computing the modified performance metric comprises:
generating a vector representation of the perturbed video using a convolutional neural network; and
computing the modified performance metric by, at least, analyzing applying a long short term memory (LSTM) network to the vector representation.

9. A computing system comprising: a processor and a non-transitory computer-readable medium coupled to the processor, the non-transitory computer-readable medium including instructions which, when executed by the processor, cause performance of a method comprising: a step for computing different performance metrics for an initial video and a perturbed version of the initial video, wherein the perturbed version of the initial video is generated by modifying frames of a video portion of the initial video; determining, based on a difference between the different performance metrics, that the video portion contributed to a predicted viewer response for the initial video; and providing an indication of the video portion as an output.

10. The computing system of claim 9, wherein the indication of the video portion can be used for modifying the initial video to affect the performance metric for the initial video.

11. The computing system of claim 9, the method further comprising: perturbing the video portion by replacing the frames in the initial video with different frames of the initial video to generate the perturbed version of the initial video.

12. The computing system of claim 11, the method further comprising:
perturbing a second video portion to generate a second perturbed video; and
computing a second modified performance metric based on the second perturbed video.

13. A non-transitory computer-readable medium having instructions stored thereon, the instructions executable by a processing device to perform operations comprising: computing, with a neural network, an initial performance metric for an initial video; generating a perturbed video by perturbing a video portion of the initial video by modifying frames of the video portion; computing, with the neural network, a modified performance metric for the perturbed video; determining, based on a difference between the initial and modified performance metrics, that the video portion contributed to a predicted viewer response to the initial video; and providing an indication of the video portion as output, wherein the indication of the video portion is usable for modifying the initial video to affect the initial performance metric.

14. The non-transitory computer-readable medium of claim 13, wherein the video portion includes a set of frames that are temporally contiguous.

15. The non-transitory computer-readable medium of claim 14, wherein the video portion is identified by applying temporal segmentation or temporal clustering.

16. The non-transitory computer-readable medium of claim 13, wherein the video portion is identified based on identifying a common object in each frame of the video portion.

17. The non-transitory computer-readable medium of claim 13, wherein perturbing the video portion in the initial video by modifying the frames of the video portion comprises replacing the frames in the video portion with different frames of the initial video.

18. The non-transitory computer-readable medium of claim 17, the operations further comprising:
perturbing a second video portion to generate a second perturbed video; and
computing a second modified performance metric based on the second perturbed video.

19. The non-transitory computer-readable medium of claim 13, wherein perturbing the video portion in the initial video by modifying the frames of the video portion comprises masking out one or more objects in a frame of the video portion.

20. The non-transitory computer-readable medium of claim 13, wherein computing the modified performance metric comprises:
generating a vector representation of the perturbed video using a convolutional neural network; and
analyzing the vector representation using a long short term memory (LSTM) network to predict the modified performance metric.

* * * * *